US006153681A

United States Patent [19]
Bekiarian

[11] Patent Number: 6,153,681
[45] Date of Patent: Nov. 28, 2000

[54] TETRAFLUOROETHYLENE AND N-ALKYL-TRIFLUOROVINYL ETHER COPOLYMER COMPOSITIONS HAVING DISCREET ELASTOMERIC AND CRYSTALLINE SECTIONS

[75] Inventor: Paul G. Bekiarian, Wilmington, Del.

[73] Assignee: E. I. du Pont de Nemours and Company, Wilmington, Del.

[21] Appl. No.: 09/111,902

[22] Filed: Jul. 8, 1998

Related U.S. Application Data

[60] Provisional application No. 60/052,545, Jul. 15, 1997.

[51] Int. Cl.[7] .............................. C08L 27/18; C08L 15/02; C08L 51/04; C08L 51/06; C08F 2/10
[52] U.S. Cl. .......................... 524/458; 524/805; 524/535; 524/520; 525/276; 525/200
[58] Field of Search .............................. 525/88, 243, 276, 525/200; 524/805, 458, 535, 520

[56] References Cited

U.S. PATENT DOCUMENTS

| | | | |
|---|---|---|---|
| 2,917,548 | 12/1959 | Dixon | 260/614 |
| 3,159,609 | 12/1964 | Harris | 260/87.5 |
| 4,158,678 | 6/1979 | Tatemoto et al. | 260/884 |
| 5,317,061 | 5/1994 | Chu et al. | 525/200 |
| 5,741,855 | 4/1998 | Kaduk et al. | 525/88 |

FOREIGN PATENT DOCUMENTS

| | | | |
|---|---|---|---|
| WO 96/41823 | 12/1996 | WIPO | C08F 214/26 |

*Primary Examiner*—Judy M. Reddick
*Assistant Examiner*—Kelechi C. Egwin

[57] ABSTRACT

Compositions which act as thermoplastic elastomers are disclosed which have an elastomeric polymer portion and a crystalline polymer portion. Also disclosed is the manufacture of thermoplastic elastomers from tetrafluoroethylene, and selected trifluorovinyl alkyl ethers (and optionally other monomers) by using a free radical polymerization in aqueous medium to produce an elastomeric copolymer of tetrafluoroethylene and one or more selected trifluorovinyl alkyl ethers, and thereafter using a free radical polymerization to form a fluorinated crystalline polymer portion. The fluorinated thermoplastic elastomer has excellent physical properties and may be used to make molding such as gaskets and seals.

16 Claims, No Drawings

TETRAFLUOROETHYLENE AND N-ALKYL-TRIFLUOROVINYL ETHER COPOLYMER COMPOSITIONS HAVING DISCREET ELASTOMERIC AND CRYSTALLINE SECTIONS

This application claims the priority benefit of U.S. Provisional Application No. 60/052,545, filed Jul. 15, 1997.

FIELD OF THE INVENTION

Novel polymeric fluorinated thermoplastic elastomer compositions which can be made by sequentially polymerizing in aqueous medium an elastomeric polymeric portion from tetrafluoroethylene and a selected trifluorovinyl alkyl ether and a fluorinated crystalline polymeric portion, are described.

TECHNICAL BACKGROUND

Elastomers (rubbers) are important commercial materials, being used in many common items. Until a couple of decades ago, most rubber was crosslinked to make it a useable material. However, once crosslinked the rubber could not be reformed, and for most practical purposes scrap or used rubber could not be reused. This problem was solved to some extent by the introduction of so-called thermoplastic elastomers (TPEs, also sometimes called elastoplastics), which are thermoplastics which can be remolded, but at their normal use temperatures act like crosslinked elastomers. Most TPEs derive their rubberlike properties because they are polymers which have elastomeric and thermoplastic segments. The elastomeric segments give the TPEs their elastomer-like properties, while the thermoplastic segments act much as chemical crosslinks do.

While TPEs with properties similar to hydrocarbon-type elastomers have been in use for many years, more highly chemically and thermally resistant TPEs have been much more difficult to obtain. This is partly because in being chemically resistant it is more difficult to assemble the various polymer segments needed for a TPE. Fluoropolymers are a well known type of polymer that are chemically and thermally resistant and are known in thermoplastic and elastomeric forms. However, there has been great difficulty in obtaining fluorinated TPEs that have properties approaching the "conventional" thermoset fluoropolymers.

U.S. Pat. No. 4,158,678 describes the preparation of certain "segmented polymers containing fluorine". These polymers are free radically prepared and involve the use of certain iodine compounds. At least some of the polymers described in this patent are said to possess "a thermoplastic rubbery property".

M. Tatemoto, Purasuchikkusu, vol. 42, No. 10 (1991), p. 71–76 describes certain fluorinated thermoplastic elastomers, made by a free radical process dependent on chain transfer to iodine atoms bound to carbon atoms. Polymers with structures disclosed herein are not described.

SUMMARY OF THE INVENTION

This invention provides a composition comprising a melt processible polymeric material. The melt processible polymeric material of these compositions has a tensile set of 10 percent or less when tested at 100 percent elongation using the modified ASTM D 412-92 test (as described herein) and includes (A) from about 40 to about 90 percent by weight of an elastomeric portion which is polymeric and has (i) repeat units of formula I $$—CF_2CF_2—  \quad (I)$$

and (ii) repeat units of formula II $$—CF_2CF(OC_nH_{2n+1}O_m)—  \quad (II),$$

wherein the n for each repeat unit of formula II is independently an integer of 1 to 6, and the m for each repeat unit of formula II is independently 0, 1, 2 or 3; and (B) a crystalline portion which is polymeric and contains fluorinated polymer.

This invention also provides a process for producing a thermoplastic elastomer, comprising (a) producing an elastomeric polymer by free radically polymerizing in aqueous emulsion or aqueous dispersion monomers consisting essentially of $$CF_2=CF_2$$

and one or more of formula III $$CF_2=CF(OC_nH_{2n+1}O_m)  \quad (III),$$

wherein the n for each formula III monomer is independently an integer of 1 to 6, and the m for each formula III monomer is independently 0, 1, 2, or 3; and then (b) without isolating said elastomeric polymer from said aqueous emulsion or aqueous dispersion, free radically polymerizing one or more monomers, at least one of which is fluorinated, such that a crystalline polymeric portion is produced; provided that said polymerizations of (a) and (b) are controlled so that the elastomeric portion is from about 40 to about 90 weight percent of the polymeric material produced by the process.

This invention also provides a thermoplastic elastomer produced by this process.

DETAILS OF THE INVENTION

Certain terms used herein are defined as follows:

By a TPE having a crystalline polymeric portion or crystalline polymer is meant that the TPE has a heat of fusion of at least 1 J/g, preferably at least 5 J/g, associated with a melting point of more than 35° C., when measured by the method of ASTM D-3417-83, but using a heating rate of 20° C./min. The melting point shall be taken as the peak of the melting endotherm.

By an elastomeric polymeric portion or elastomeric polymer is meant a polymer entity that does not have a heat of fusion of 1 J/g, (or more preferably does not have a heat of fusion of 0.5 or more) associated with a melting point of 35° C. or more, preferably 100° C. or more, when measured by Differential Scanning calorimetry using the method of ASTM D-3417-83, except using a heating rate of 20° C./min. The melting point shall be taken as the peak of the melting endotherm. Also the elastomeric polymeric portion or elastomeric polymer shall not have a glass transition temperature above 35° C., preferably not above 10° C. when measured using the method of ASTM D-3417-83, but using a heating rate of 20° C./min. The glass transition temperature shall be taken as the midpoint of the measured transition.

By a modified ASTM D-412-92 test is meant the conditions of this test are used as described for measuring tensile set, except that sample thickness is about 0.64 mm (0.025 in.), and the grip separation rate is 5.08 cm/min (2.0 in./min).

By a thermoplastic elastomer is meant substantially elastomeric material that can be processed and recycled like a thermoplastic polymer (i.e., can be shaped and reshaped by heating to make the TPE amenable to flow, and then cooling to retain the shape in which the TPE was cooled). In other words, a TPE is melt processible.

The elastomeric polymeric portion or elastomeric polymer is made from tetrafluoroethylene (TFE), which gives repeat unit (I), and one or more compounds of the formula $CF_2=CF(OC_nH_{2n+1}O_m)$(III) which gives repeat unit (II). For each compound (III), n is independently an integer of 1 to 6 and each m is independently 0, 1, 2 or 3. Whether an elastomeric polymer entity is produced depends on the ratio of (I):(II), and what exactly m and n are, and whether (II) is a single repeat unit (all of n and m the same) or a mixture of repeat units (repeat units with different m and/or n). Generally speaking, the lower this ratio the more likely an elastomeric polymer entity will be made.

In all preferred (II) and (III), m is 0 or 1, more preferably 0. The index "m" represents the number of ether oxygen atoms in the grouping —$C_nH_{2n+1}O_m$. When m is 0, this is a simple alkyl group. When m is 0 it is preferred that —$C_nH_{2n+1}$ is an n-alkyl group, and more preferred that it is n-butyl or n-propyl. In the elastomeric polymer entity a preferred molar ratio of (I):(II) is about 80:20 to about 50:50, more preferably about 75:25 to about 65:35.

The crystalline polymer entity may have any composition as long as there is fluorine in this polymer, the monomer(s) it is made from may be free radically polymerized in an aqueous environment as described more fully below, and the resulting TPE has the requisite properties. Useful crystalline polymer entities include poly(chlorotrifluoroethylene), a copolymer of (I) and (II) repeat units, poly(vinylidene fluoride), a copolymer of (III) and chlorotrifluoroethylene, a copolymer of tetrafluoroethylene and ethylene, and a copolymer of chlorotrifluoroethylene and ethylene. A preferred crystalline polymer entity is a copolymer of (I) and (II). Such a copolymer may be crystalline if (I) is present in high enough proportions relative to (II). Therefore it is preferred that the molar ratio of (I):(II) in the crystalline polymer(ic portion) is about 99:1 to about 85:15, more preferably about 94:6 to about 90:10. When (I) and (II) are present in the crystalline polymer entity it is preferred that m is 0 or 1, more preferably 0. Again, "m" represents the number of ether oxygen atoms in the grouping —$C_nH_{2n+1}O_m$. When m is 0, this is a simple alkyl group. When m is 0 it is preferred that —$C_nH_{2n+1}$ is an n-alkyl group, and more preferred that it is n-butyl or n-propyl.

It is preferred that the crystalline polymeric portion of the TPE have a relatively high melting point, but not so high that the melt processing temperatures required are so high the polymer undergoes significant decomposition on melt processing. The melting point (the highest melting point, if more than one melting point is present) of the crystalline polymeric portion is preferably about 100° C. to about 300° C., more preferably about 150° C. to about 250° C.

The elastomeric portion of the TPE is about 40 to about 90 weight percent of the TPE, preferably about 50 to about 75 weight percent of the TPE. These percentages are based on the total weight of the elastomeric and crystalline portions of the TPE and does not include any other ingredients such as filters. The proportions of the elastomeric and crystalline portions are obtained by calculating the amount of monomer polymerized into the polymer under conditions in which elastomeric or crystalline polymers, respectively, are produced. Thus for instance in Example 5 one half by weight of the TPE was made under conditions (e.g., monomer ratios) in which an elastomer would be produced, and one half by weight of the TPE was made under conditions (e.g., monomer ratios) in which a crystalline polymer would be produced.

The polymerizations described herein are free radical polymerizations carried out in an aqueous medium, usually in aqueous emulsion or aqueous suspension. Such polymerization processes, including those involving fluorinated monomers, are well known in the art, see for instance B. Elvers, et al., Ed., Ullmann's Encyclopedia of Industrial Chemistry, Vol. A21, $5^{th}$ Ed., VCH Verlagsgesellschaft mbH, Weinheim, 1992, p. 305–428; H. Mark, et al., Ed., Encyclopedia of Polymer Science and Engineering, Vol. 13, John Wiley & Sons, New York, 1988, p. 708–867; and H. Mark, et al., Ed., Encyclopedia of Polymer Science and Engineering, Vol. 6, John Wiley & Sons, New York, 1986, p. 1–51, which are all hereby incorporated herein by reference. Similarly, what fluorinated compounds will act as polymerizable monomers, and what combinations of compounds will copolymerize, are well known in the art, see for instance W. Gerhartz, et al., Ed., Ulhnann's Encyclopedia of Industrial Chemistry, Vol. A11, 5th Ed., VCH Verlagsgesellschaft mbH, Weinheim, 1988, p. 393–429; and H. Mark, et al., Ed., Encyclopedia of Polymer Science and Engineering, Vol. 16, John Wiley & Sons, New York, 1989, p. 577–648, which are all hereby incorporated herein by reference. The specific polymerizations described herein may be carried out as appropriate by those methods known in the art, subject to any modifications mentioned herein. Conventional polymerization conditions, such as initiator and surfactant used, temperature, pressure, etc., may be used.

The polymerizations may be run in any convenient manner, for instance batch, semi-batch or continuous, or any combination of these for the two polymerization steps. In one preferred embodiment both the elastomeric and crystalline polymeric portions are made in continuous reactors, and/or the elastomeric polymeric portion is made first. This is particularly preferred when (I) and (II) are the repeat units in both the elastomeric and crystalline polymeric portions of the product TPE. For instance, two continuous reactors, with differing ratios of TFE and (III), in them may be used in series (cascade reactors). These two portions may also be made batchwise or semi-batchwise in the same reactor, first by making the elastomeric portion, and then changing the relative amounts of TFE and (III) so as to produce a crystalline polymer, see for instance Examples 1–4.

The resulting TPE generally has excellent properties. The fluorinated nature of the TPE usually lends good chemical and/or high temperature resistance to it. Physical properties such as tensile strength, elongation, and tensile set (an excellent measure of the "rubberiness" of the TPE) are usually quite good, often being comparable to fluorinated thermoset elastomers. It is preferred that the tensile set of the TPE, when measured by a modified ASTM D412-92 test at 100% elongation be $\leq 10\%$, more preferably less than 6% tensile set.

It is also preferred that the TPEs described herein have a tensile strength at break of about 6.9 MPa or more and/or an elongation to break of about 100% or more preferably about 100–600%, all when measured by the modified ASTM D-412-92 method.

Although not wishing to be bound by theory, at least when the elastomeric polymer entity is made first it is believed that this portion is a branched elastomer, the branching taking place by free radical chain transfer on the unfluorinated alkyl (or alkoxy) group of (II). When the crystalline polymer entity is then made it is believed that it too chain transfers to the unfluorinated alkyl (or alkoxy) group of (II) thereby becoming branches on the original elastomeric polymer portion. In other words, the final TPE may in essence be a graft copolymer, with crystalline polymeric segments grafted onto the "original" elastomeric portion of the TPE. Some of the crystalline polymer entity may not be grafted onto the elastomeric portion.

Since chain transfer may be so important, it is preferred to control the amount of chain transfer in the polymerizations. The amount of chain transfer is dependent (among other things) on the monomers being polymerized, as well as any polymer that may be present during the polymerization. If the above hypothesis is correct, some chain transfer is desired, but not excessive chain transfer that would lead, for instance, to polymers that are too low in molecular weight. It is known that higher temperatures usually favor more chain transfer. In the present polymerization processes, preferred temperatures are about 30° C. to about 80° C., more preferably about 30° C. to about 50° C.

These TPEs may be mixed or blended with other polymers, and with other types of materials which TPEs (and other polymers) are often blended, such as reinforcing agents such as carbon black and glass fibers, pigments such as $TiO_2$, fillers such as clay, antioxidants, lubricants, mold releases, etc. These materials may be added to the TPEs in conventional amounts.

The TPEs described herein are useful as molding resins for various articles such as seals and gaskets. They are especially useful where chemical and/or thermal resistance are needed. They may be shaped by various typical thermoplastic forming methods such as extrusion and injection molding. The TPEs are useful for instance for seals, 0-rings, gaskets, hoses, tubing, film, flat sheet, and cable and wire jacketing. They are especially useful where the TPE may be in contact with one or more moving parts, such as for shaft seals, which may be 0-rings or chevron rings. The TPEs may also be used to fabricate hoses and tubes (e.g., convoluted hoses and tubing); and can be included in dispersions used for coating objects with a TPE.

In the Examples, all pressure are gauge pressures unless otherwise noted. $\Delta H_f$ is heat of fusion or heat of melting, Tg is glass transition temperature and DSC is differential scanning calorimetry. ASTM D-3417-83 and modified ASTM D-412-92 were used.

EXAMPLE 1

A 3600 ml, horizontal, stainless-steel autoclave equipped with 4-bladed agitator was charged with 2000 ml deionized water, 0.5 g sodium sulfite and 28 g ammonium perfluorooctanoate. The autoclave was sealed, pressurized with nitrogen to 690 kPa then vented to 0 kPa. This pressure/venting cycle was repeated two times. The autoclave was evacuated to −97 kPa then purged with $CF_2$=$CF_2$ (TFE) to 0 kPa. This evacuation/purge cycle was repeated two times. At 0 kPa of TFE in the autoclave, 0.5 ml $CF_2$=CF—O—$C_4H_9$ (BuFVE) was injected into the autoclave. The autoclave was agitated at 200 rpm and heated to 35° C. and charged with an additional 191 g TFE and 14 ml BuFVE (a 95:5 mole ratio). The pressure reached a maximum of about 2.1 MPa. Solution A, containing 2 g ammonium persulfate and 2 ml concentrated ammonium hydroxide per 100 ml deionized water, was injected at 3 ml/min for 3 min. Concurrently, solution B, containing 2.2 g sodium sulfite per 100 ml deionized water, was injected at 3 ml/min for 3 min. Solutions A and B were then each injected continuously at 0.5 ml/min. The polymerization initiated; a mixture of TFE and BuFVE in a 70:30 mole ratio was fed to the autoclave at about the rate at which it was consumed maintaining about 2.1 MPa pressure in the autoclave. The reaction was continued in this manner until about 386 g of TFE and BuFVE were fed to the autoclave. The mole ratio of TFE to BuFVE being fed to the polymerization was then changed to 92:8 and the reaction was continued until an additional 116 g of TFE and BuFVE were fed to the autoclave. The overall reaction rate was 359 g/hr. The autoclave contents were cooled to ambient temperature, vented to 0 kPa and discharged as a polymer emulsion containing 21 wt % polymer. The emulsion was frozen to cause agglomeration of the polymer particles and their separation from the aqueous phase. The polymer agglomerates were filtered and washed five times with water at about 50° C. then dried at 100° C. under partial vacuum with a sweep of nitrogen to yield 478 g of granular polymer. Differential Scanning Calorimetry (DSC) analysis showed a glass transition temperature at Tg=−1.3° C. and broad crystalline melting point at Tm=229° C. on the second heat, $\Delta H_f$=3.1 J/g. Elemental analysis found: C, 29.37%; H, 1.63%; from which an average composition of 80 mole % $CF_2$=$CF_2$ and 20 mole % $CF_2$=CF—O—$C_4H_9$ could be calculated. The polymer could be pressed into clear dense slabs and films at 240° C. The fabricated polymer had the following tensile properties: initial modulus=11.8 MPa, modulus at 100% extension= 4.87 MPa, tensile strength=7.90 MPa, elongation at break= 205%, permanent set at break=39%, tensile set at 100% elongation=8.9%. The advancing contact angles for liquids on the surface of a pressed film were measured as: water= 106°; diiodomethane=77°; hexadecane=33° from which a surface tension of 22.4 dynes/cm was calculated.

EXAMPLE 2

A 3600 ml, horizontal, stainless-steel autoclave equipped with 4-bladed agitator was charged with 2000 ml deionized water, 0.5 g sodium sulfite and 28 g ammonium perfluorooctanoate. The autoclave was sealed, pressurized with nitrogen to 690 kPa then vented to 0 kPa. This pressure/venting cycle was repeated two times. The autoclave was evacuated to −97 kPa then purged with $CF_2$=$CF_2$ (TFE) to 0 kPa. This evacuation/purge cycle was repeated two times. At 0 kPa of TFE in the autoclave, 0.5 ml $CF_2$=CF—O—$C_4H_9$ (BuFVE) was injected into the autoclave. The autoclave was agitated at 200 rpm and heated to 35° C. and charged with an additional 184 g TFE and 13.4 ml BuFVE (a 95:5 mole ratio). The pressure reached a maximum of about 2.07 MPa. Solution A, containing 2 g ammonium persulfate and 2 ml concentrated ammonium hydroxide per 100 ml deionized water, was injected at 3 ml/min for 3 min. Concurrently, solution B, containing 2.2 g sodium sulfite per 100 ml deionized water, was injected at 3 ml/min for 3 min. Solutions A and B were then each injected continuously at 0.5 ml/min. The polymerization initiated; a mixture of TFE and BuFVE in a 70:30 mole ratio was fed to the autoclave at about the rate at which it was consumed maintaining about 2.07 MPa pressure in the autoclave. The reaction was continued in this manner until about 261 g of TFE and BuFVE were fed to the autoclave. The mole ratio of TFE to BuFVE being fed to the polymerization was then changed to 92:8 and the reaction was continued until an additional 250 g of TFE and BuFVE were fed to the autoclave. The overall reaction rate was 343 g/hr. The autoclave contents were cooled to ambient temperature, vented to 0 kPa and discharged as a polymer emulsion containing 21 wt % polymer. The emulsion was frozen to cause agglomeration of the polymer particles and their separation from the aqueous phase. The polymer agglomerates were filtered and washed five times with water at about 50° C. then dried at 100° C. under partial vacuum with a sweep of nitrogen to yield 479 g of granular polymer. DSC analysis showed a glass transition temperature at Tg=−12.7° C. and broad crystalline melting point at Tm=256° C., $\Delta H_f$=11.3 J/g, on the second heat. Elemental analysis found: C, 28.18%; H, 1.17%; from which an average composition of 86 mole % $CF_2=CF_2$ and 14 mole % $CF_2=CF-O-C_4H_9$ was calculated. The polymer could be pressed into clear dense slabs and films at 245° C. The fabricated polymer had the following tensile properties: initial modulus=36.7 MPa, modulus at 100% extension=6.80 MPa, tensile strength=12.1 MPa, elongation at break=137%, permanent set at break=11%, tensile set at 100% elongation=5.6%. The advancing contact angle for liquids on the surface of a pressed film were measured to be: water=120°; diiodomethane=84°; hexadecane=38° from which a surface tension of 16.0 dynes/cm was calculated.

EXAMPLE 3

A 3600 ml, horizontal, stainless-steel autoclave equipped with 4-bladed agitator was charged with 2000 ml deionized water, 0.5 g sodium sulfite and 2.8 g ammonium perfluorooctanoate. The autoclave was sealed, pressurized with nitrogen to 689 kPa then vented to 0 kPa. This pressure/venting cycle was repeated two times. The autoclave was evacuated to -97 kPa then purged with $CF_2=CF_2$ (TFE) to 0 kPa. This evacuation/purge cycle was repeated two times. At 0 kPa of TFE in the autoclave, 0.5 ml $CF_2=CF-O-C_4H_9$ (BuFVE) was injected into the autoclave. The autoclave was agitated at 200 rpm and heated to 35° C. and charged with an additional 191 g TFE and 13.9 ml BuFVE (a 95:5 mole ratio). The pressure reached a maximum of about 2.07 MPa. Solution A, containing 2 g ammonium persulfate and 2 ml concentrated ammonium hydroxide per 100 ml deionized water, was injected at 3 ml/min for 3 min. Concurrently, solution B, containing 2.2 g sodium sulfite per 100 ml deionized water, was injected at 3 ml/min for 3 min. Solutions A and B were then each injected continuously at 0.5 ml/min. The polymerization initiated; a mixture of TFE and BuFVE in a 70:30 mole ratio was fed to the autoclave at about the rate at which it was consumed maintaining about 2.07 MPa pressure in the autoclave. The reaction was continued in this manner until about 303 g of TFE and BuFVE were fed to the autoclave. The mole ratio of TFE to BuFVE being fed to the polymerization was then changed to 92:8 and the reaction was continued until an additional 303 g of TFE and BuFVE were fed to the autoclave. The overall reaction rate was 303 g/hr. The autoclave contents were cooled to ambient temperature, vented to 0 kPa and discharged as a polymer emulsion containing 23 wt % polymer. The emulsion was frozen to cause agglomeration of the polymer particles and their separation from the aqueous phase. The polymer agglomerates were filtered and washed five times with water at about 50° C. then dried at 100° C. under partial vacuum with a sweep of nitrogen to yield 585 g of granular polymer. DSC analysis showed a glass transition temperature at Tg=-5.6° C. and broad crystalline melting point at Tm=234° C., $\Delta H_f$=5.7 J/g, on the second heat. Elemental analysis found: C, 28.43%; H, 1.34%; from which an average composition of 84 mole % $CF_2=CF_2$ and 16 mole % $CF_2=CF-O-C_4H_9$ was calculated. The polymer could be pressed into clear dense slabs and films at 250° C. The fabricated polymer had the following tensile properties: initial modulus=32.5 MPa, modulus at 100% extension=75.5 MPa, tensile strength=11.4 MPa, elongation at break=195%, tensile set at 100% elongation=5.8%.

EXAMPLE 4

A 3600 ml, horizontal, stainless-steel autoclave equipped with 4-bladed agitator was charged with 2000 ml deionized water, 0.5 g sodium sulfite and 2.8 g ammonium perfluorooctanoate. The autoclave was sealed, pressurized with nitrogen to 689 kPa then vented to 0 kPa. This pressure/venting cycle was repeated two times. The autoclave was evacuated to -97 kPa then purged with $CF_2=CF_2$ (TFE) to 0 kPa. This evacuation/purge cycle was repeated two times. At 0 kPa of TFE in the autoclave, 0.5 ml $CF_2=CF-O-C_4H_9$ (BuFVE) was injected into the autoclave. The autoclave was agitated at 200 rpm and heated to 35° C. and charged with an additional 191 g TFE and 13.9 ml BuFVE (a 95:5 mole ratio). The pressure reached a maximum of about 2.07 MPa. Solution A, containing 2 g ammonium persulfate and 2 ml concentrated ammonium hydroxide per 100 ml deionized water, was injected at 3 ml/min for 3 min. Concurrently, solution B, containing 2.2 g sodium sulfite per 100 ml deionized water, was injected at 3 ml/min for 3 min. Solutions A and B were then each injected continuously at 0.5 ml/min. The polymerization initiated; a mixture of TFE and BuFVE in a 70:30 mole ratio was fed to the autoclave at about the rate at which it was consumed maintaining about 2.07 MPa pressure in the autoclave. The reaction was continued in this manner until about 407 g of TFE and BuFVE were fed to the autoclave. The mole ratio of TFE to BuFVE being fed to the polymerization was then changed to 92:8 and the reaction was continued until an additional 202 g of TFE and BuFVE were fed to the autoclave. The overall reaction rate was 300 g/hr. The autoclave contents were cooled to ambient temperature, vented to 0 kPa and discharged as a polymer emulsion containing 23 wt % polymer. The emulsion was frozen to cause agglomeration of the polymer particles and their separation from the aqueous phase. The polymer agglomerates were filtered and washed five times with water at about 50° C. then dried at 100° C. under partial vacuum with a sweep of nitrogen to yield 592 g of granular polymer. DSC analysis showed a glass transition temperature at Tg=-5.9° C. and broad crystalline melting point at Tm=247° C., $\Delta H_f$=5.0 J/g, on the second heat. Elemental analysis found: C, 29.21%; H, 1.5334%; from which an average composition of 81.5 mole % $CF_2=CF_2$ and 18.5 mole % $CF_2=CF-O-C_4H_9$ was calculated. The polymer could be pressed into clear dense slabs and films at 250° C. The fabricated polymer had the following tensile properties: initial modulus=12.8 MPa, modulus at 100% extension=5.01 MPa, tensile strength= 9.64 MPa, elongation at break=244%, tensile set at 100% elongation=4.7%.

EXAMPLE 5

Preparation of $CF_2=CF_2/CF_2=CF-O-C_3H_7$ Elastoplastic in Aqueous Medium at 35° C.:50 wt % Elastomer Containing 30 mole % $CF_2=CF-O-C_3H_7$; 50 wt % Thermoplastic Containing 8 mole % $CF_2=CF-O-C_3H_7$ A 3600 ml, horizontal, stainless-steel autoclave equipped with 4-bladed agitator was charged with 2000 ml deionized water, 0.5 g sodium sulfite and 2.8 g ammonium perfluorooctanoate. The autoclave was sealed, pressurized with nitrogen to 690 kPa then vented to 0 kPa. This pressure/venting cycle was repeated two times. The autoclave was evacuated to -97 kPa then purged with $CF_2=CF_2$ (TFE) to 0 kPa. This evacuation/purge cycle was repeated two times. At 0 kPa of TFE in the autoclave, 0.5 ml $CF_2=CF-O-C_3H_7$ (PrFVE) was injected into the autoclave. The autoclave was agitated at 175 rpm and heated to 35° C. and charged with an additional 192 g TFE and 13 ml PrFVE (a 95:5 mole ratio). The pressure reached a maximum of about 2.1 MPa. Solution A, containing 2 g ammonium persulfate and 2 ml concentrated ammonium hydroxide per 100 ml deionized water, was injected at 3 ml/min for 3 min. Concurrently, solution B, containing 2.2 g sodium sulfite per 100 ml deionized water, was injected at 3 ml/min for 3 min.

Solutions A and B were then each injected continuously at 0.5 ml/min. The polymerization initiated; a mixture of TFE and PrFVE in a 70:30 mole ratio was fed to the autoclave at about the rate at which it was consumed maintaining about 2.1 MPa pressure in the autoclave. The reaction was continued in this manner until about 304 g of TFE and PrFVE were fed to the autoclave. The mole ratio of TFE to PrFVE being fed to the polymerization was then changed to 92:8 and the rate of solution A and B was reduced to 0.25 ml/min. The reaction was continued until an additional 300 g of TFE and PrFVE were fed to the autoclave. The overall reaction rate was 393 g/hr. The autoclave contents were cooled to ambient temperature, vented to 0 kPa and discharged as a polymer emulsion containing 24 wt % polymer. The emulsion was frozen to cause agglomeration of the polymer particles and their separation from the aqueous phase. The polymer agglomerates were filtered and washed five times with water at about 50° C., then dried at 100° C. under partial vacuum with a sweep of nitrogen to yield 616 g of granular polymer. DSC analysis showed a glass transition temperature at Tg=−4.0° C. and broad crystalline melting point at Tm=255° C. ($\Delta H_f$=1.9 J/g) on the second heat. Elemental analysis found: C, 27.23 wt %; H, 1.02 wt %; from which an average composition of 87 mole % $CF_2$=$CF_2$ and 13 mole % $CF_2$=CF—O—$C_3H_7$ could be calculated. The polymer could be pressed into clear dense slabs and films at 280° C. The fabricated polymer had the following tensile properties: initial modulus=32 MPa, modulus at 100% extension=6.5 MPa, tensile strength=15.1 MPa, elongation at break=334%, tensile set at 100% elongation=9.9%.

EXAMPLE 6

Preparation of $CF_2$=$CF_2$/$CF_2$=CF—O—$C_3H_7$ Elastoplastic in Aqueous Medium at 35° C.:66 wt % Elastomer Containing 30 mole % $CF_2$=CF—O—$C_3H_7$; 34 wt % Thermoplastic Containing 8 mole % $CF_2$=CF—O—$C_3H_7$ A 3600 ml, horizontal, stainless-steel autoclave equipped with 4-bladed agitator was charged with 2000 ml deionized water, 0.5 g sodium sulfite and 2.8 g ammonium perfluorooctanoate. The autoclave was sealed, pressurized with nitrogen to 690 kPa then vented to 0 kPa. This pressure/venting cycle was repeated two times. The autoclave was evacuated to −97 kPa then purged with $CF_2$=$CF_2$ (TFE) to 0 kPa. This evacuation/purge cycle was repeated two times. At 0 kPa of TFE in the autoclave, 0.5 ml $CF_2$=CF—O—$C_3H_7$ (PrFVE) was injected into the autoclave. The autoclave was agitated at 175 rpm and heated to 35° C. and charged with an additional 184 g TFE and 12 ml PrFVE (a 95:5 mole ratio). The pressure reached a maximum of about 2.1 MPa. Solution A, containing 2 g ammonium persulfate and 2 ml concentrated ammonium hydroxide per 100 ml deionized water, was injected at 3 ml/min for 3 min. Concurrently, solution B, containing 2.2 g sodium sulfite per 100 ml deionized water, was injected at 3 ml/min for 3 min. Solutions A and B were then each injected continuously at 0.5 ml/min. The polymerization initiated; a mixture of TFE and PrFVE in a 70:30 mole ratio was fed to the autoclave at about the rate at which it was consumed maintaining about 2.1 MPa pressure in the autoclave. The reaction was continued in this manner until about 405 g of TFE and PrFVE were fed to the autoclave. The mole ratio of TFE to PrFVE being fed to the polymerization was then changed to 92:8 and the rate of solution A and B was reduced to 0.25 ml/mln. The reaction was continued until an additional 204 g of TFE and PrFVE were fed to the autoclave. The overall reaction rate was 286 g/hr. The autoclave contents were cooled to ambient temperature, vented to 0 kPa and discharged as a polymer emulsion containing 24 wt % polymer. The emulsion was frozen to cause agglomeration of the polymer particles and their separation from the aqueous phase. The polymer agglomerates were filtered and washed five times with water at about 50° C. then dried at 100° C. under partial vacuum with a sweep of nitrogen to yield 628 g of granular polymer. DSC analysis showed a at Tg=−3.8° C. and broad crystalline melting point at Tm=285° C. ($\Delta H_f$=7.2 J/g) on the second heat. Elemental analysis found: C, 27.98 wt %; H, 1.30 wt %; from which an average composition of 83.8 mole % $CF_2$=$CF_2$ and 16.2 mole % $CF_2$=CF—O—$C_3H_7$ could be calculated. The polymer could be pressed into clear dense slabs and films at 280° C. The fabricated polymer had the following tensile properties: initial modulus=11.2 MPa, modulus at 100% extension=4.0 MPa, tensile strength=11.2 MPa, elongation at break=395%, tensile set at 100% elongation=9.7%.

EXAMPLE 7

Preparation of $CF_2$=$CF_2$/$CF_2$=CF—O—$C_3H_7$ Elastoplastic in Aqueous Medium at 35° C.:75 wt % Elastomer Containing 30 mole % $CF_2$=CF—O—$C_3H_7$; 25 wt % Thermoplastic Containing 8 mole % $CF_2$=CF—O—$C_3H_7$ A 3600 ml, horizontal, stainless-steel autoclave equipped with 4-bladed agitator was charged with 2000 ml deionized water, 0.5 g sodium sulfite and 2.8 g ammonium perfluorooctanoate. The autoclave was sealed, pressurized with nitrogen to 690 kPa then vented to 0 kPa. This pressure/venting cycle was repeated two times. The autoclave was evacuated to −97 kPa then purged with $CF_2$=$CF_2$ (TFE) to 0 kPa. This evacuation/purge cycle was repeated two times. At 0 kPa of TFE in the autoclave, 0.5 ml $CF_2$=CF—O—$C_3H_7$ (PrFVE) was injected into the autoclave. The autoclave was agitated at 175 rpm and heated to 35° C. and charged with an additional 188 g TFE and 13 ml PrFVE (a 95:5 mole ratio). The pressure reached a maximum of about 2.1 MPa. Solution A, containing 2 g ammonium persulfate and 2 ml concentrated ammonium hydroxide per 100 ml deionized water, was injected at 3 ml/min for 3 min. Concurrently, solution B, containing 2.2 g sodium sulfite per 100 ml deionized water, was injected at 3 ml/min for 3 min. Solutions A and B were then each injected continuously at 0.5 ml/min. The polymerization initiated; a mixture of TFE and PrFVE in a 70:30 mole ratio was fed to the autoclave at about the rate at which it was consumed maintaining about 2.1 MPa pressure in the autoclave. The reaction was continued in this manner until about 459 g of TFE and PrFVE were fed to the autoclave. The mole ratio of TFE to PrFVE being fed to the polymerization was then changed to 92:8 and the rate of solution A and B was reduced to 0.25 ml/min. The reaction was continued until an additional 187 g of TFE and PrFVE were fed to the autoclave. The overall reaction rate was 274 g/hr. The autoclave contents were cooled to ambient temperature, vented to 0 kPa and discharged as a polymer emulsion containing 24 wt % polymer. The emulsion was frozen to cause agglomeration of the polymer particles and their separation from the aqueous phase. The polymer agglomerates were filtered and washed five times with water at about 50° C. then dried at 100° C. under partial vacuum with a sweep of nitrogen to yield 659 g of granular polymer. DSC analysis showed a at Tg=4.0° C. and broad crystalline melting point at Tm=265° C. ($\Delta H_f$=7.9 J/g) on the second heat. Elemental analysis found: C, 28.01 wt %; H, 1.22 wt %; from which an average composition of 83.7 mole % $CF_2$=$CF_2$ and 16.3 mole % $CF_2$=CF—O—$C_3H_7$ could be calculated. The polymer could be pressed into clear dense slabs and films at 270° C. The fabricated polymer had the following tensile properties: initial modulus=7.85 MPa, modulus at 100% extension=3.7 MPa, tensile strength= 11.35 MPa, elongation at break=354%, tensile set at 100% elongation=8%.

COMPARATIVE EXAMPLE A

INVERSE POLYMERIZATION

Preparation of $CF_2$=$CF_2$/$CF_2$=CF—O—$C_4H_9$ Elastoplastic in Aqueous Medium at 35° C.:50 wt % Thermoplastic Core Containing 8 mole % $CF_2$=CF—O—$C_4H_9$; 50 wt % Elastomer Containing 30 mole % $CF_2$=CF—O—$C_4H_9$ A 3600 ml, horizontal, stainless-steel autoclave equipped with 4-bladed agitator was charged with 2000 ml deionized water, 0.5 g sodium sulfite and 28 g ammonium perfluorooctanoate. The autoclave was sealed, pressurized with nitrogen to 690 kPa then vented to 0 kPa. This pressure/venting cycle was repeated two times. The autoclave was evacuated to −97 kPa then purged with $CF_2$=$CF_2$ (TFE) to 0 kPa. This evacuation/purge cycle was repeated two times. At 0 kPa of TFE in the autoclave, 0.5 ml $CF_2$=CF—O—$C_4H_9$ (BuFVE) was injected into the autoclave. The autoclave was agitated at 200 rpm and heated to 35° C. and charged with an additional 191 g TFE and 14.5 ml BuFVE (a 95:5 mole ratio). The pressure reached a maximum of about 2.1 MPa. Solution A, containing 2 g ammonium persulfate and 2 ml concentrated ammonium hydroxide per 100 ml deionized water, was injected at 3 ml/min for 3 min. Concurrently, solution B, containing 2.2 g sodium sulfite per 100 ml deionized water, was injected at 3 ml/min for 3 min. Solutions A and B were then each injected continuously at 0.5 ml/min. The polymerization initiated; a mixture of TFE and BuFVE in a 92:8 mole ratio was fed to the autoclave at about the rate at which it was consumed maintaining about 2.1 MPa pressure in the autoclave. The reaction was continued in this manner until about 259 g of TFE and BuFVE were fed to the autoclave. The mole ratio of TFE to BuFVE being fed to the polymerization was then changed to 70:30 and the reaction was continued until an additional 251 g of TFE and BuFVE were fed to the autoclave. The overall reaction rate was 342 g/hr. The autoclave contents were cooled to ambient temperature, vented to 0 kPa and discharged as a polymer emulsion containing 22 wt % polymer. The emulsion was frozen to cause agglomeration of the polymer particles and their separation from the aqueous phase. The polymer agglomerates were filtered and washed five times with water at about 50° C. then dried at 100° C. under partial vacuum with a sweep of nitrogen to yield 557 g of granular polymer. DSC analysis showed a glass transition temperature at Tg=−2.3° C. and broad crystalline melting point at Tm=249° C. ($\Delta H_f$=3.5 J/g) on the second heat. Elemental analysis found: C, 28.38 wt %; H, 1.33 wt %; from which an average composition of 86.5 mole % $CF_2$=$CF_2$ and 13.5 mole % $CF_2$=CF—O—$C_4H_9$ could be calculated. The polymer could be pressed into clear dense slabs and films at 280° C. The fabricated polymer had the following tensile properties: initial modulus=72.1 MPa, modulus at 100% extension=6.9 MPa, tensile strength=8.5 MPa, elongation at break=192%, tensile set at 100% elongation=21.4%.

COMPARATIVE EXAMPLE B

INVERSE POLYMERIZATION

Preparation of $CF_2$=$CF_2$/$CF_2$=CF—O—$C_4H_9$ Elastoplastic in Aqueous Medium at 35° C.:25 wt % Thermoplastic Containing 8 mole % $CF_2$=CF—O—$C_4H_9$; 75 wt % Elastomer Containing 30 mole % $CF_2$=CF—O—$C_4H_9$ A 3600 ml, horizontal, stainless-steel autoclave equipped with 4-bladed agitator was charged with 2000 ml deionized water, 0.5 g sodium sulfite and 28 g ammonium perfluorooctanoate. The autoclave was sealed, pressurized with nitrogen to 690 kPa then vented to 0 kPa. This pressure/venting cycle was repeated two times. The autoclave was evacuated to −97 kPa then purged with $CF_2$=$CF_2$ (TFE) to 0 kPa. This evacuation/purge cycle was repeated two times. At 0 kPa of TFE in the autoclave, 0.5 ml $CF_2$=CF—O—$C_4H_9$ (BuFVE) was injected into the autoclave. The autoclave was agitated at 200 rpm and heated to 35° C. and charged with an additional 188 g TFE and 14 ml BuFVE (a 95:5 mole ratio). The pressure reached a maximum of about 2.1 MPa. Solution A, containing 2 g ammonium persulfate and 2 ml concentrated ammonium hydroxide per 100 ml deionized water, was injected at 3 ml/min for 3 min. Concurrently, solution B, containing 2.2 g sodium sulfite per 100 ml deionized water, was injected at 3 ml/min for 3 min. Solutions A and B were then each injected continuously at 0.5 ml/min. The polymerization initiated; a mixture of TFE and BuFVE in a 92:8 mole ratio was fed to the autoclave at about the rate at which it was consumed maintaining about 2.1 MPa pressure in the autoclave. The reaction was continued in this manner until about 136 g of TFE and BuFVE were fed to the autoclave. The mole ratio of TFE to BuFVE being fed to the polymerization was then changed to 70:30 and the reaction was continued until an additional 376 g of TFE and BuFVE were fed to the autoclave. The overall reaction rate was 332 g/hr. The autoclave contents were cooled to ambient temperature, vented to 0 kPa and discharged as a polymer emulsion containing 22 wt % polymer. The emulsion was frozen to cause agglomeration of the polymer particles and their separation from the aqueous phase. The polymer agglomerates were filtered and washed five times with water at about 50° C. then dried at 100° C. under partial vacuum with a sweep of nitrogen to yield 571 g of granular polymer. DSC analysis showed a Tg=−9.9° C. and broad crystalline melting point at Tm=257° C. ($\Delta H_f$=6.7 J/g) on the second heat. Elemental analysis found: C, 29.69 wt %; H, 1.64 wt %; from which an average composition of 82.1 mole % $CF_2$=$CF_2$ and 17.9 mole % $CF_2$=CF—O—$C_4H_9$ could be calculated. The polymer could be pressed into clear dense slabs and films at 280° C. The fabricated polymer had the following tensile properties: initial modulus=8 MPa, modulus at 100% extension=3.1 MPa, tensile strength=4.8 MPa, elongation at break=325%, tensile set at 100% elongation=13.3%.

COMPARATIVE EXAMPLE C

ELASTOMER PLASTIC LATEX BLENDS 34 wt % Thermoplastic Containing 8 mole % $CF_2$=CF—O—$C_4H_9$; 66 wt % Elastomer Containing 30 mole % $CF_2$=CF—O—$C_4H_9$ Separate emulsions of TFE/BuFVE elastomer copolymer (A), containing 70 mole % TFE and 30 mole % BuFVE (Tg=−6.3° C.), and TFE/BuFVE plastic copolymer (B) containing 92 mole % TFE and 8 mole % BuFVE (Tm=272° C., $\Delta H_f$=19.4 J/g), were prepared in accord with the methods of Example 1. Emulsion (A) containing 33 g TFE/BuFVE elastomer copolymer was mixed with emulsion (B) containing 17 g TFE/BuFVE plastic copolymer. The resulting blend of emulsion (A) and (B) was frozen to cause agglomeration of the polymer particles and their separation from the aqueous phase. The polymer agglomerates were filtered and washed five times with water at about 50° C. then dried at 100° C. under partial vacuum with a sweep of nitrogen to yield 48 g of granular polymer. DSC analysis showed a Tg=−7.3° C. and broad crystalline melting point at Tm=274° C. ($\Delta H_f$=9.97 J/g) on the second heat. The polymer could be pressed into dense slabs at 290° C. The slabs were not uniform and exhibited leathery texture and poorly dispersed opaque regions characteristic of plastic/elastomer phase separation. The fabricated polymer had the following tensile properties: initial modulus=30.2 MPa, modulus at 100% extension=3.54 MPa, tensile strength=3.47 MPa, elongation at break=123%, tensile set at 100% elongation=35%.

What is claimed is:

1. A composition comprising:

a melt processible polymeric material which has a tensile set of 10 percent or less, when tested at 100 percent elongation using a modified ASTM D 412-92 test where the sample thickness is about 0.64 mm and the grip separation rate is 5.08 cm/min and includes (A) from about 40 to about 90 percent by weight of an elastomeric portion which is polymeric and has (i) repeat units of formula I $$-CF_2CF_2- \qquad (I)$$

and (ii) repeat units of formula II $$-CF_2CF(OC_nH_{2n+1}O_m)- \qquad (II),$$

wherein the n for each repeat unit of formula II is independently an integer of 1 to 6, and the m for each repeat unit of formula II is independently 0, 1, 2 or 3; and (B) a crystalline portion which is polymeric and contains fluorinated polymer.

2. A process for producing a thermoplastic elastomer, comprising:

(a) producing an elastomeric polymer by free radically polymerizing in aqueous emulsion or aqueous dispersion monomers consisting essentially of $$CF_2=CF_2$$

and one or more of formula III $$CF_2=CF(OC_nH_{2n+1}O_m) \qquad (III),$$

wherein the n for each formula III monomer is independently an integer of 1 to 6, and the m for each formula III monomer is independently 0, 1, 2, or 3; and then (b) without isolating said elastomeric polymer from said aqueous emulsion or aqueous dispersion, free radically polymerizing one or more monomers, at least one of which is fluorinated, such that a crystalline polymeric portion is produced;

provided that said polymerizations of (a) and (b) are controlled so that the elastomeric portion is from about 40 to about 90 weight percent of the polymeric material produced by the process.

3. A thermoplastic elastomer produced by the process of claim 2.

4. The composition as recited in claim 1 wherein m is 0 or 1.

5. The composition as recited in claim 1 wherein m is 0.

6. The composition as recited in claim 5 wherein $-C_nH_{2n+1}$ is n-alkyl.

7. The composition as recited in claim 6 wherein said n-alkyl is n-propyl or n-butyl.

8. The composition as recited in claim 1 wherein said crystalline portion is a polymer consisting essentially of repeat units (I) and (II).

9. The process as recited in claim 2 wherein m is 0 or 1.

10. The process as recited in claim 2 wherein m is 0.

11. The process as recited in claim 10 wherein $-C_nH_{2n+1}$ is n-alkyl.

12. The process as recited in claim 11 wherein said n-alkyl is n-propyl or n-butyl.

13. A thermoplastic elastomer in accordance with claim 3 wherein m is 0 or 1.

14. A thermoplastic elastomer in accordance with claim 3 wherein m is 0.

15. A thermoplastic elastomer in accordance with claim 14 wherein $-C_nH_{2n+1}$ is n-alkyl.

16. A thermoplastic elastomer in accordance with claim 15 wherein $-C_nH_{2n+1}$ is n-propyl or n-butyl.

* * * * *